United States Patent
Edlinger

(10) Patent No.: US 7,240,520 B2
(45) Date of Patent: Jul. 10, 2007

(54) METHOD AND DEVICE FOR PULVERIZING AND GRANULATING MELTS

(75) Inventor: Alfred Edlinger, Bartholomäberg (AT)

(73) Assignee: Holcim Ltd., Zurich (CH)

( * ) Notice: Subject to any disclaimer, the term of this patent is extended or adjusted under 35 U.S.C. 154(b) by 661 days.

(21) Appl. No.: 10/648,959

(22) Filed: Aug. 27, 2003

(65) Prior Publication Data

US 2005/0188723 A1   Sep. 1, 2005

(30) Foreign Application Priority Data

Aug. 29, 2002   (AT) ............................... A 1292/2002

(51) Int. Cl.
*C03B 37/06* (2006.01)

(52) U.S. Cl. .............................. 65/454; 65/19; 65/21.2; 65/463; 65/465; 264/12

(58) Field of Classification Search ............... 65/19, 65/21.2, 522, 524, 525, 528, 454, 460, 463, 65/465, 466, 467, 468, 136.3, 464; 75/338; 264/12; 425/7

See application file for complete search history.

(56) References Cited

U.S. PATENT DOCUMENTS

| | | | | |
|---|---|---|---|---|
| 3,063,093 A | * | 11/1962 | Barnard | 65/465 |
| 3,138,444 A | * | 6/1964 | Searight et al. | 65/21.2 |
| 6,660,223 B2 | * | 12/2003 | Edlinger | 266/202 |
| 2002/0134198 A1 | * | 9/2002 | Edlinger | 75/338 |

FOREIGN PATENT DOCUMENTS

WO    WO 0162987 A1 *   8/2001
WO    WO 0204154 A1 *   1/2002

* cited by examiner

*Primary Examiner*—Eric Hug
*Assistant Examiner*—Queenie Dehghan
(74) *Attorney, Agent, or Firm*—Chapman and Cutler LLP

(57) ABSTRACT

In a process for pulverizing and granulating melts, especially oxidic slag, glass, or thermoplastic melts, in which the melts are heated with burner (6) in an antechamber (5) and ejected as a shroud surrounding a propellant stream into a granulating chamber (11), hot combustion gases from the antechamber (5) are mixed with the propellant stream.

6 Claims, 2 Drawing Sheets

METHOD AND DEVICE FOR PULVERIZING AND GRANULATING MELTS

FIELD OF THE INVENTION

The invention relates to a method for pulverizing melts and granulating them, especially oxidic slags, glass, metal, or thermoplastic melts in which the melts are heated with burners in an antechamber and are ejected into a granulating chamber as a shroud surrounding the efflux and a device for carrying out this process.

BACKGROUND OF THE INVENTION

Processes for granulating and milling fluid melts and especially slags or metal melts and glass melts in which the melts are sprayed as a fluid stream into a cooling chamber have already become known in different versions. EP 1038976 A1 shows and describes a process of this type in which, for improving the material properties of the granulate, the procedure is such that the sprayed melt droplets in the spray stream are heated to temperatures between 1500° C. and 1750° C. by afterburning of hot gases in the inside of the cooling chamber, whereby the subsequent cooling chamber is designed with radiant heat sinks. This method is based on the consideration that the cooling speed of particles is dependent on the diameter of the particles, whereby radiant cooling increases greatly with increasing particle size. However, spraying that is as fine as possible also has the advantage that when e.g. aggregates will be produced for the cement industry, a subsequent grinding process can be dispensed with if an adequately fine division of the droplets and/or particles has been carried out. Fluid slags, and especially oxidic slags, generally lie at temperatures between 1250° C. and 1650° C. whereby the viscosity of these types of melts decreases with increasing temperature. A decreasing viscosity has the consequence that it is easier to produce especially small particles during spraying. In EP 1038967 A1, this was mainly the goal with respect to efficient radiant cooling. In WO 01/62987 A1, a device for pulverizing fluid melts, and especially oxidic slags or glasses, was suggested in which a slag tundish is provided which has an outlet opening. Into this outlet opening, a lance dips for ejecting gases or steam with the formation of a ring slot. The lance is surrounded by an outer pipe that is height-adjustable, independently of the height adjustability of the lance, so that lowering and raising the outside pipe can adjust the width of the ring slot and thus the material flow of the melt while propellant gas can be brought in with the inner lance. Propellant gas can be brought in with the inner lance. Preferably, autothermic-generated steam is used here as a propellant gas stream, whereby for an appropriate heating or overheating of the steam a relatively high effort has to be made. Further improvements and modifications of this process principle can be found in WO 02/04687 A1 and WO 00/44942, among others. In this case, a combustion exhaust gas is used for ejecting the melt whereby hot combustion exhaust gases, especially after complete combustion, are used for spraying the melt. Overall it has been observed that the use of a propellant gas with especially high temperatures leads to a better grinding of the stream and thus to a finer distribution because of the gas viscosity that is increased due to the higher temperature whereby the preparation, compression, and distribution of the propellant gases involves relatively high effort.

SUMMARY OF THE INVENTION

The goal of the invention is now a process of the type mentioned at the beginning in which, with the greatest possible choice in the propellant gas or propellant steam used, not only an appropriate overheating of the melt for the purpose of reducing the viscosity of the melt can be achieved, but also a corresponding overheating of the propellant gas and/or propellant steam in the ejection area, whereby the energy use of the heat to be used and the corresponding energy recuperation can be improved. To solve this task, the process according to the invention essentially consists in that hot combustion gases from the antechamber are mixed with the propellant stream. In the antechamber and especially in a tundish with corresponding cover, the required heat for overheating the melt is applied with burners according to the requirements. Because of the fact that now any propellant stream, e.g. propellant steam or other propellant gases with comparatively low pressures on an order of magnitude of 1 bar to 10 bar can be used for this to suction hot combustion gases out of the antechamber and to add them to the antechamber, in the area in which this hot propellant gas is now ejected as the core of a tube-shaped shroud of the melt, an especially high temperature develops and because of the elevated gas viscosity connected with it, a very good shear effect on the inner shroud of the escaping melt film. In this process, depending on the setting of a corresponding gate pipe, the melt flows as an especially thin film with formation of a ring slot and thus as an especially thin shroud on the propellant gas stream. For especially efficient grinding, the hose-like structure of this stream can now be maintained advantageously over a certain minimum period whereby a selective and especially effective grinding can occur. Advantageously, the process according to the invention is carried out here in such a way that the hot combustion gases of the antechamber are suctioned through an adjustable throttle cross section in a ring chamber surrounding the propellant stream nozzle and can be ejected into the granulating chamber with the propellant stream as the core of the tube-shaped melt stream, whereby for stabilizing the essentially cylindrical structure of the pipe-shaped shroud, advantageously the shroud of the melt stream can be stressed at the outlet or after the outlet to the granulating chamber on its external side with hot gases for stabilizing a structure of the pipe-shaped shroud that is essentially cylindrical. With a procedure such as this, which only requires slight modifications in the equipment that is already known, the parameters thus desired for an especially fine grinding and for the formation of corresponding spherical particles can be varied within wide limits so that the yield of spheroidized particles with especially small diameter can be optimized. For this type of spheroidization, it is necessary to first maintain the particles for a specific minimum period of time at high temperature and to promote the formation of appropriately small spherical particles depending on the surface tension. Cooling that is too fast could lead to the promotion of the formation of filiform structures, which can be avoided by carrying out the procedure according to the invention.

The device according to the invention for pulverizing and granulating melts, especially oxidic slag, glass, or thermoplastic melts, which are ejected from a heated antechamber through an outlet opening with a propellant stream into a granulating chamber, whereby a propellant stream nozzle is mounted on the inside of the antechamber and surrounded by a height adjustable pipe that immerses into the melt is preferably further developed for carrying out this method in that the pipe, at an axial distance from the end that dips into the melt with the formation of a ring slot with respect to the outlet opening, has radial passages which open out into the gas chamber of the antechamber above the melt and that a slide is mounted that surrounds the pipe in axial direction or in circumference direction and is adjustable for adjusting the inner passage cross section of the passages. With a device of this type, by raising and lowering the pipe having the radial passage, the corresponding ring slot and thus the formation of a thin film can now be adjusted, whereby because of the slide that can be adjusted in axial or in circumference direction which cooperates with the radial passages, the quantity of hot combustion gases suctioned out of the combustion chamber above the melt can be regulated. In this way, an appropriate temperature of the propellant gas stream in the area of the opening and/or outlet opening can be ensured by a percentage of combustion gases with temperatures from 1600° C. to 1800° C., depending on the amount of desired overheating of the melt, which ensures an adequately high gas viscosity and thus sufficiently high shear forces for an effective grinding. In the area of the tundish outlet and/or the outlet opening of the antechamber, the first forming action for stabilizing the essentially cylindrical structure of the pipe-shaped melt shroud can be carried out, for which the design is preferably made in such a way that the outlet opening is designed as a concentric nozzle and is connected to the propellant medium connection. To achieve the appropriately high gas temperatures, preferably at least one burner is mounted in the antechamber.

In order to ensure a specific dwell time for forming appropriate spheroidized particles, the granulating chamber is preferably designed in such a way that it has a cross section that expands conically in the area adjacent to the outlet opening of the antechamber, in which other radially oriented nozzles and/or burners are mounted, whereby, for one thing, the particle temperature is maintained here, or with nozzles that are oriented slightly downward, additional coolant can be blown in. This area is used with high propellant gas nozzle pushers (5 bar to 10 bar) for secondary expansion similar to the divergent outlet part of a Laval nozzle. The actual cooling zone follows this partial area of the granulating chamber and the formation is preferably made such that the granulating chamber, after the cross section that expands conically, is designed at least partially as a radiant cooling chamber. An especially fast final cooling can be achieved in that the granulating chamber is surrounded by a cold eddy current.

DESCRIPTION OF THE DRAWINGS

In the following, the invention will be explained using a schematically represented embodiment example in the drawing of a device that is especially suitable for carrying out the process according to the invention. In it.

DETAILED DESCRIPTION

Figure 1:
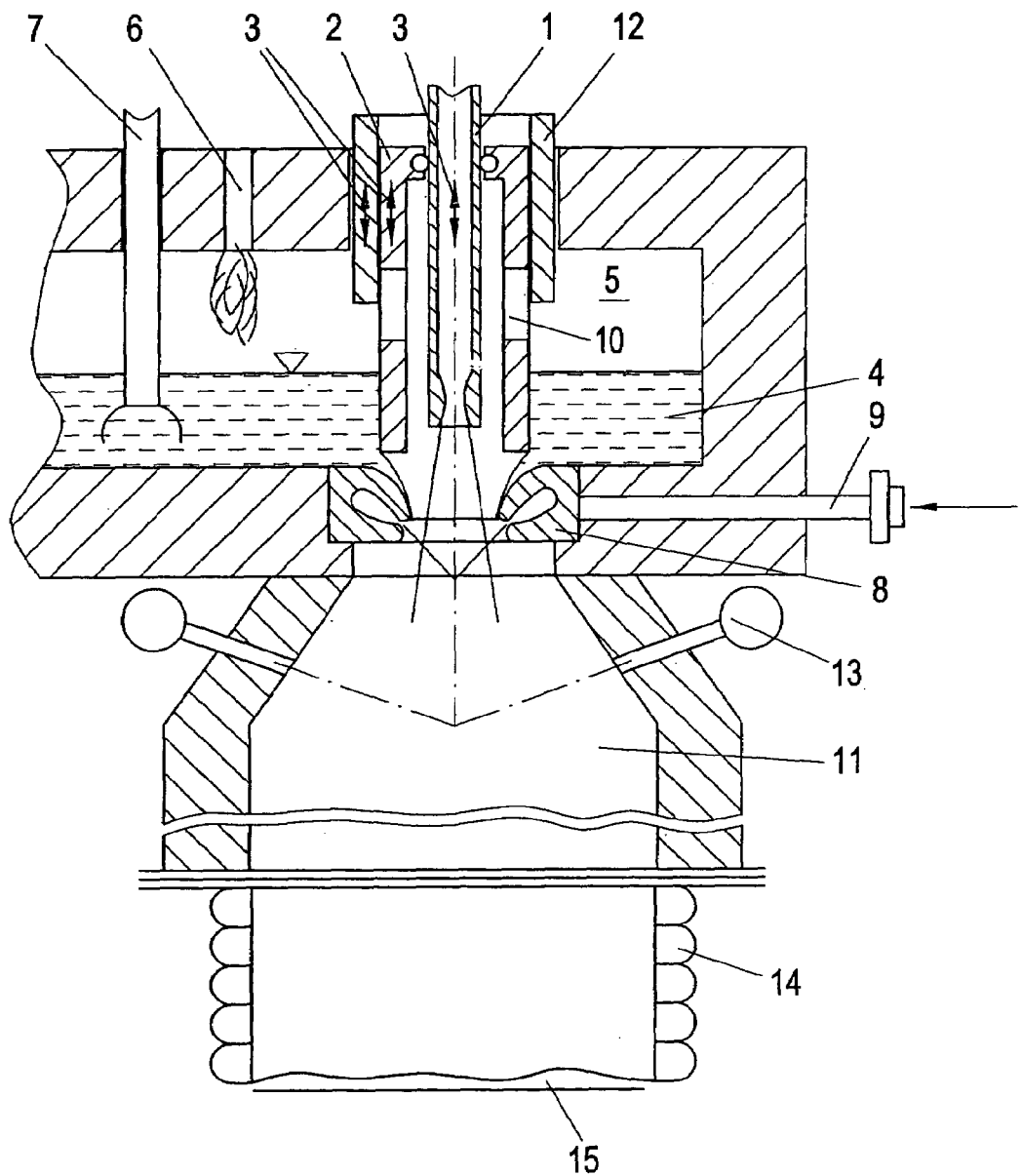
FIG. 1 shows a cross section through the pulverizing head of a preferred device for carrying out the process according to the invention.

FIG. 1 shows a lance 1 with a primary nozzle, by which propellant gases and/or propellant steam are brought in. Lance 1 is surrounded by a first cylindrical pipe 2, which is designed as a gate pipe and can be moved in height in the direction of double arrow 3 and is guided tight against lance 1. Lance 1 can also be adjusted in height in the direction of double arrow 3. The gate pipe 2 is immersed into melt 4, which is placed in an antechamber 5 and/or in a tundish. Antechamber 5 and/or the tundish are designed so that they close appropriately and have burner 6 with which the melt 4 can be overheated. In addition, a lance burner 7 can be seen with which, if necessary, a foamed slag can be produced since this type of foamed slag can also be pulverized with the device according to the invention with no problems.

The tundish outlet and/or the outlet opening of the antechamber 5 are designed as a concentric nozzle 8 which can supply propellant steam or propellant gas over a line 9. In the area of this concentric nozzle 8, a tube-shaped film develops because of the axial clearance of a ring slot through gate pipe 2 in the core of which propellant is injected through lance 1. Since the propellant gas and/or the propellant steam have comparatively low temperatures, there could be undesirable premature solidification of the melt in the area of outlet opening 8. In order to now obtain an appropriately hot and highly viscous gas during spraying, the combustion gas formed by the burners 6 is suctioned over radial passages 10 of gate pipe 2 out of the combustion chamber of antechamber 5 and mixed with the propellant stream and ejected into a subsequent granulating chamber 11. In order to regulate the amount of this intake, a throttle slide valve 12 is provided which encircles the gate pipe in the area of the radial passages 10 and can either be moved in height direction, again in correlation with double arrow 3 in order to more or less cover or release the openings, or swivel in circumference direction.

The thin film-like tube of the melt now goes, after it leaves the outlet opening 8, into cooling chamber 11, whereby in a first conically expanding area of this cooling chamber another concentric nozzle 13 can be seen through which propellant gases, especially hot combustion gas with temperatures from about 1400° C. to 1800° C., can be brought in. Instead of these nozzles connected to the ring line, naturally burners can also be mounted here for afterburning. Only after a first partial area of the cooling chamber does the cooling occur by radiant cooling, especially to autothermic propellant steam (gas) generation for which the walls of the granulating chamber are provided with cooling coils 14. Finally, on the floor of the granulating chamber, thermoshock cooling can be provided in the form of a cold eddy layer 15. In this actual cooling area, heat recuperation can also be carried out.

Figure 2:
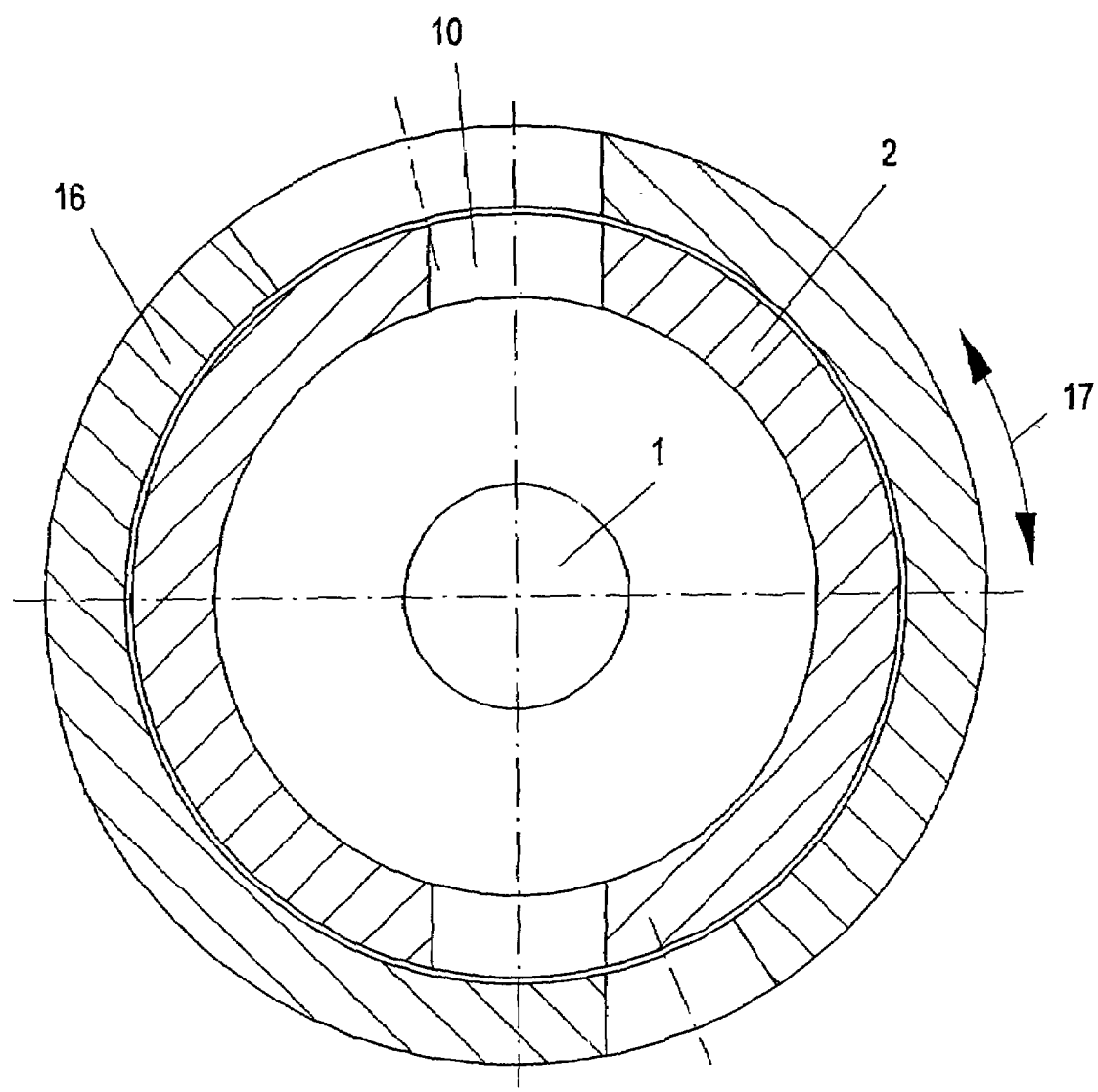
FIG. 2 shows a cross section through the valve device and/or the throttle device for intake of hot combustion exhaust gas with a propellant stream nozzle.

In the embodiment according to FIG. 2, a cross section through the lance 1, the gate pipe 2 and the modified design of the throttle slide valve can be seen which is now indicated with 16. Instead of the slide designated with 12 in FIG. 1, which could be moved in height direction in the sense of double arrow 3, sleeve 16 can now be turned in circumference direction in the direction of arrow 17 and when it is turned, releases a more or less large partial area of the radial passages 10 of the gate pipe or covers them. The corresponding adjustment of the hot gas quantity suctioned from the gas chamber of the tundish and/or the antechamber is also regulated with such a design, whereby the corresponding axial adjusting capabilities of the lance and of the gate pipe are maintained unchanged in order to optimally adjust the parameters required for the fine distribution of the tube-shaped film. If there is a fixed "valve sleeve," the gate pipe can also be turned continuously. In this process, a pulsed intake of the tundish hot exhaust gas occurs, which results in advantages during the pulverizing. The rotation frequency, together with a valve stroke that has a fixed setting, results in a specific hot gas quantity. Another advantage of the gate pipe rotation consists in a decrease in the structure viscosity and a better heat distribution because of a stirring effect.

In addition, the antechamber can also be at an excess pressure in comparison to the cooling chamber so that hot combustion gases can not only be suctioned but can also be ejected under pressure.

The invention claimed is:

1. Process for pulverizing and granulating melts, comprising the steps of heating melts with burners in an antechamber, and ejecting said melts into a granulating chamber as a shroud surrounding a propellant stream, wherein hot combustion gases from the antechamber are mixed with the propellant stream, and wherein the hot combustion gases from the antechamber are suctioned by way of an adjustable throttle cross-section into a ring chamber surrounding a propellant stream nozzle, and are ejected with the propellant stream as a core of a tube-shaped melt stream into the granulating chamber.

2. Process according to claim 1, wherein the shroud is stressed at its output into the granulating chamber, on its outside, with hot gases for stabilizing an essentially cylindrical structure of the shroud.

3. Process according to claim 2, wherein the melts are oxidic slag, glass or thermoplastic melts.

4. Process according to claim 1, wherein the shroud is stressed after its output into the granulating chamber, on its outside, with hot gases for stabilizing an essentially cylindrical structure of the shroud.

5. Process according to claim 4, wherein the melts are oxidic slag, glass or thermoplastic melts.

6. Process according to claim 1, wherein the melts are oxidic slag, glass or thermoplastic melts.

* * * * *